(12) United States Patent
Wang et al.

(10) Patent No.: US 10,718,402 B2
(45) Date of Patent: Jul. 21, 2020

(54) SELF-ADAPTIVE TORSIONAL VIBRATION DAMPER AND DIESEL ENGINE

(71) Applicant: SOOCHOW UNIVERSITY, Suzhou (CN)

(72) Inventors: Gang Wang, Suzhou (CN); Zhihua Feng, Suzhou (CN); Junfang Ni, Suzhou (CN); Xiangjun Lan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 16/490,645

(22) PCT Filed: Oct. 17, 2018

(86) PCT No.: PCT/CN2018/110559
§ 371 (c)(1),
(2) Date: Sep. 3, 2019

(87) PCT Pub. No.: WO2019/080751
PCT Pub. Date: May 2, 2019

(65) Prior Publication Data
US 2019/0390734 A1    Dec. 26, 2019

(30) Foreign Application Priority Data
Oct. 23, 2017  (CN) .......................... 2017 1 0992062

(51) Int. Cl.
*F16F 15/14*  (2006.01)
(52) U.S. Cl.
CPC ................................ *F16F 15/1414* (2013.01)

(58) Field of Classification Search
CPC ..... F16F 15/1414; F16F 15/1421; F16F 15/14
See application file for complete search history.

(56) References Cited

U.S. PATENT DOCUMENTS 6,142,115 A * 11/2000 Haas ....................... F02B 67/08
123/192.1

FOREIGN PATENT DOCUMENTS

| CN | 1253246 A | 5/2000 |
|---|---|---|
| CN | 201568525 U | 9/2010 |
| CN | 106574691 A | 4/2017 |
| CN | 107606054 A | 1/2018 |
| CN | 207406704 U | 5/2018 |
| DE | 102006023831 A1 | 11/2007 |
| DE | 102012202661 A1 | 8/2013 |
| EP | 0999546 A1 | 5/2000 |

\* cited by examiner

*Primary Examiner* — Thomas C Diaz
(74) *Attorney, Agent, or Firm* — SZDC Law P.C.

(57) ABSTRACT

A self-adaptive torsional vibration reducer is provided, which includes an inner casing, an outer casing and resonance bodies provided between the inner casing and the outer casing. Each of the resonance bodies includes a mass-block and constraining springs supporting the mass-block between the inner casing and the outer casing. The resonance bodies are provided in pairs and are symmetrically distributed around a center of the rotating shaft. In a case that a frequency of an excitation force on the rotating shaft is coincided with the resonance frequency, the resonance bodies absorb torsional vibration energy at the frequency to reduce vibration. A diesel engine including the self-adaptive torsional vibration reducer is also provided.

16 Claims, 2 Drawing Sheets

SELF-ADAPTIVE TORSIONAL VIBRATION DAMPER AND DIESEL ENGINE

The application is the National Stage Application of International Patent Application No. PCT/CN2018/110559, titled "SELF-ADAPTIVE TORSIONAL VIBRATION DAMPER AND DIESEL ENGINE", filed on Oct. 17, 2018, which claims the priority to Chinese patent application No. 201710992062.9 titled "SELF-ADAPTIVE TORSIONAL VIBRATION DAMPER AND DIESEL ENGINE", filed with the China National Intellectual Property Administration on Oct. 23, 2017, which is both of which are incorporated herein by reference in its entirety.

FIELD

The present disclosure relates to the technical field of rotating shaft vibration control, and in particular to a self-adaptive torsional vibration reducer and a diesel engine.

BACKGROUND

Torsional vibration is related to the degree of the influence of an excitation force frequency on a natural frequency in a transmission system, which reflects a danger degree of the resonance in the system. The torsional vibration is extremely destructive, because it may change the torsional stress acting on the shaft, increase the fatigue damage of the shaft, reduce the service life, and even cause damage or breakage to the shafting, which affects the safe and reliable operation of the shafting.

When studying the torsional vibration problem of the rotating shaft system, it is found that if the excitation force acting on the shaft is periodic, for example, in diesel engines and pumps, it will inevitably cause torsional vibration of the shafting. The existence of torsional vibration is a potential threat to the safe operation of the shafting, so it is necessary to control such torsional vibration. Taking a diesel engine as an example, the spectrum of the excitation force of such a reciprocating machine is a multi-line spectrum. Taking four-stroke as an example, the spectrum of the excitation force includes multiples of the half-harmonic of the rotation speed, thereby causing the torsional vibration at these frequencies. If the amplitude value of such torsional vibration can be controlled, the safe operation of the shafting can be greatly enhanced.

In the conventional technology, most of the torsional vibration reducers are vibration dampers. That is, the torsional vibration energy is converted into thermal energy to suppress the amplitude of the torsional vibration. Such torsional vibration reducer is complicated in structure and is expensive. Also, such torsional vibration reducer causes heating of the shafting in the energy conversion process, thereby affecting the service life of the device.

It has been studied that high amplitude values of the torsional vibration of the shafting mainly occur at points of multiples of the frequency or half-frequency of the rotation. Therefore, if it is aimed to absorb energy at these frequencies, the amplitude value of the torsional vibration can be reduced from the source, so as to ensure the safe operation of the shafting.

SUMMARY

In view of above, a self-adaptive torsional vibration reducer is provided according to the present disclosure, in which resonance bodies are arranged to, when a frequency of an excitation force on the rotating shaft is coincided with the resonance frequency, absorb the torsional vibration energy at this frequency to reduce vibration. Therefore, the amplitude value of the torsional value can be reduced from the source to ensure the safe operation of the shafting system.

The provided self-adaptive torsional vibration reducer includes an inner casing, an outer casing, and resonance bodies provided between the inner casing and the outer casing. The torsional vibration reducer is sleeved on an outer side of a rotating shaft. The inner casing and the outer casing are both arranged concentrically with the rotating shaft, and the inner casing is fastened to the rotating shaft. Each of the resonance bodies includes a mass-block and constraining springs supporting the mass-block between the inner casing and the outer casing. The resonance bodies are provided in pairs and are symmetrically distributed around a center of the rotating shaft.

During operation of the rotating shaft, the mass-block has a resonance frequency in a tangential direction of a rotation of the rotating shaft under a constraint of the constraining spring. In a case that a frequency of an excitation force on the rotating shaft is coincided with the resonance frequency, the resonance bodies absorb the torsional vibration energy at this frequency to reduce vibration.

A diesel engine is further provided according to the present disclosure, which includes a rotating shaft and the above torsional vibration reducer. The number of the resonance bodies is 2n, where $n \geq 1$. The torsional vibration reducer is configured to absorb torsional vibration energy of multiple harmonics at the same time. If the diesel engine is a four-stroke diesel engine, the resonance bodies are configured to absorb the torsional vibration energy of 0.5, 1, 1.5, 2, . . . , n/2 harmonics. If the diesel engine is a two-stroke diesel engine, the resonance bodies are configured to absorb the torsional vibration energy of 1, 2, 3, . . . , n harmonics.

Compared with the conventional technology, the self-adaptive torsional vibration reducer according to the present disclosure has the following advantages.

By fixing the torsional vibration reducer onto the rotating shaft, when a frequency of an excitation force on the rotating shaft is coincided with the resonance frequency, the resonance bodies can absorb the torsional vibration energy at this frequency to reduce vibration. Therefore, the amplitude value of the torsional vibration can be reduced from the source to ensure the safe operation of the shafting system.

Moreover, the torsional vibration reducer is simple in structure and convenient to be installed, thereby reducing the cost.

Figure 1:
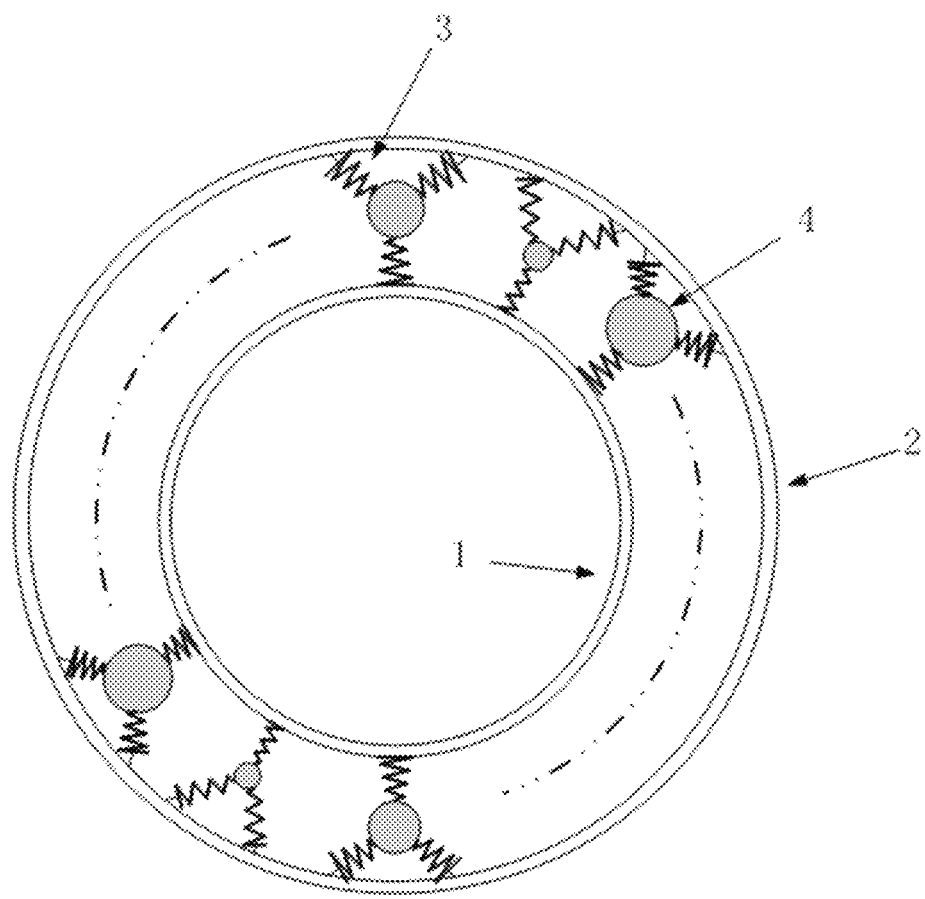
FIG. 1 is a schematic view showing the structure of a torsional vibration reducer according to the present disclosure.

| Reference Numerals in FIG. 1: | |
|---|---|
| 1 inner casing, | 2 outer casing, |
| 3 constraining spring, | 4 mass-block. |

DETAILED DESCRIPTION

As described in the Background, most existing torsional vibration reducers are vibration dampers, which are complicated in structure and are expensive. Also they can easily cause heating of the shafting in the energy conversion process, thereby affecting the service life of the device.

In view of the disadvantages in the conventional technology, a self-adaptive torsional vibration reducer is provided according to the present disclosure. Resonance bodies are provided to, when a frequency of an excitation force on the rotating shaft is coincided with the resonance frequency, absorb the torsional vibration energy at this frequency to reduce vibration. Therefore, the amplitude of the torsional vibration can be reduced from the source, so as to ensure the safe operation of the shafting system.

The technical solutions according to embodiments of the present disclosure are described clearly and completely hereinafter in conjunction with the embodiments of the present disclosure. Apparently, the described embodiments are only a part of the embodiments of the present disclosure, rather than all embodiments. Based on the embodiments in the present disclosure, all of other embodiments, made by the person skilled in the art without any creative efforts, fall into the scope of the present disclosure.

Figure 2:
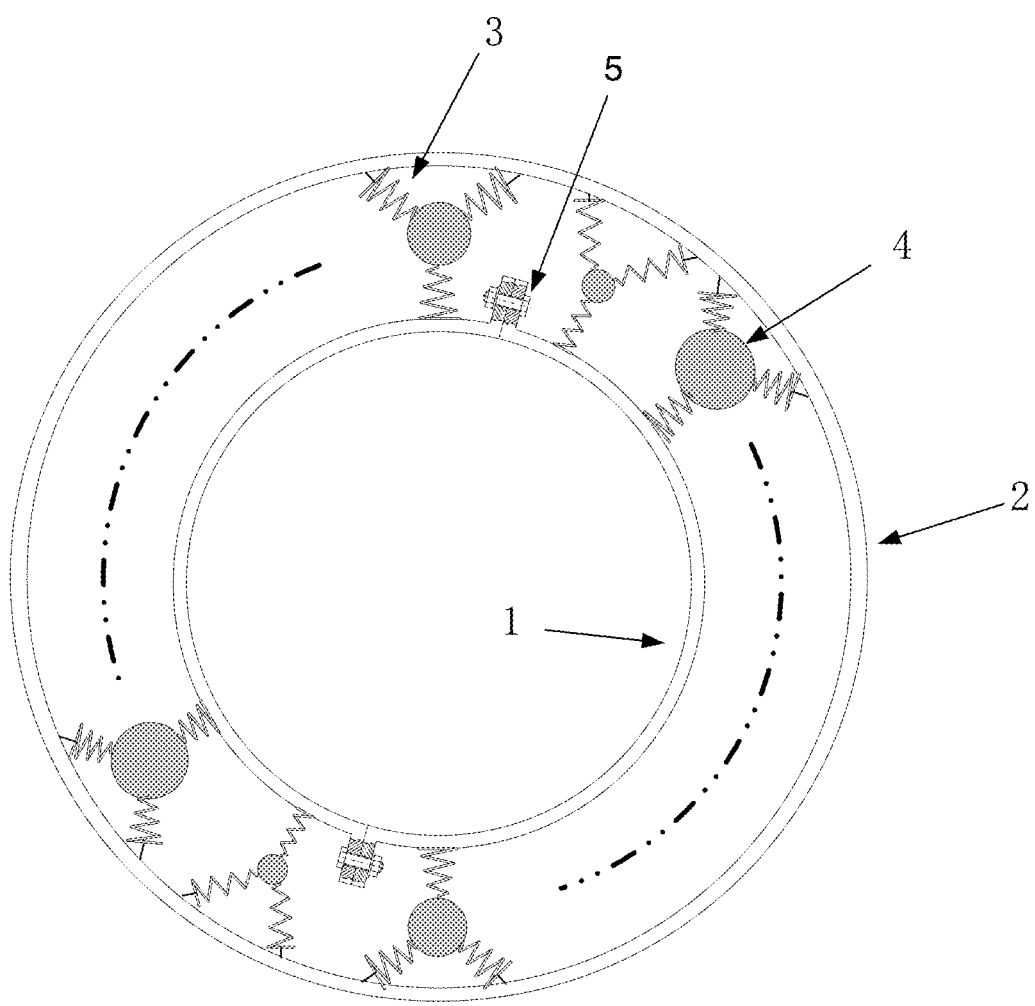
FIG. 2 is a schematic view showing the structure of an inner casing formed in a complete circular structure by splicing two semi-circular parts through bolts according to an embodiment of the present application.

Referring to FIG. 1, a self-adaptive torsional vibration reducer includes an inner casing 1, an outer casing 2, and resonance bodies provided between the inner casing 1 and the outer casing 2. The torsional vibration reducer is sleeved on an outer side of a rotating shaft (not shown). The inner casing and the outer casing are both arranged concentrically with the rotating shaft. The inner casing is fastened to the rotating shaft. By fastening the inner casing of the resonator to the rotating shaft, the torsional vibration of the rotating shaft is transmitted to the inside of the resonator to be absorbed and reduced. The inner casing and the outer casing are both arranged concentrically with the rotating shaft and are both in round tubular structures. In order to facilitate sleeving the inner casing on the rotating shaft, the inner casing is formed in a circular structure by splicing at least two parts in arc structures. An inner wall of the circular structure is in close contact with an outer wall of the rotating shaft. The inner casing is in a pre-tightened state, to be fixed to the rotating shaft. As shown in FIG. 2, it is preferable that the inner casing 1 is formed by two semi-circular parts that are spliced and fixed to the outer side of the rotating shaft by bolts 5. In other embodiments, the inner casing may be formed by two parts that are spliced by a snap connection, a pin connection or a binding connection, which is not limited.

Each resonance body includes a mass-block 4 and constraining springs 3 supporting the mass-block 4 between the inner casing 1 and the outer casing 2. The resonance bodies are symmetrically distributed around a center of the rotating shaft to ensure the stability of the vibration reducing system. At least two resonance bodies are symmetrically arranged about the center of the rotation shaft. In this embodiment, three pairs of resonance bodies are preferably provided. In other embodiments, one or more pairs may be provided, which is determined according to actual application requirements, and is not limited herein.

During the operation of the rotating shaft, the mass-block 4 has a resonance frequency in a tangential direction of a rotation of the rotating shaft under a constraint of the constraining spring 3. In a case that a frequency of an excitation force on the rotating shaft is coincided with the resonance frequency, the resonance bodies absorb the torsional vibration energy at this frequency to reduce vibration. Therefore, the amplitude value of the torsional vibration can be reduced from the source, so as to ensure the safe operation of the shafting system.

Further, each mass-block 4 may be connected to the inner casing 1 through at least one constraining spring 3 and connected to the outer casing 2 through at least two constraining springs 3. Each of the constraining springs 3 is in a stretched state after being fixedly connected, to generate sufficient constraining force to constrain the movement of the mass-block. The stretching condition is determined according to actual requirements.

Preferably, the number of the constraining springs 3 is three, and the mass-block 4 is vertically connected to the inner casing 1 through one constraining spring 3, and connected to the outer casing 2 through two constraining springs 3 which are arranged symmetrically and obliquely. Ends of the three constraining springs 3 form apexes of an isosceles triangle, which effectively improves the stability of the resonance bodies. In fact, the number of the constraining springs in the embodiment may be appropriately increased or decreased, which is not specifically limited.

Further, the parameters of a pair of the resonance bodies provided opposite to each other in a radial direction may be the same, and the parameters of adjacent pairs of the resonance bodies may be the same or different.

Further, each of the mass-blocks 4 may be in a spherical structure, or in other structures such as ellipsoid and rectangle in some embodiments. The mass-blocks in same pair may have the same size and shape, and the mass-blocks in adjacent pairs may have same size and shape or have different sizes and shapes, as long as they are distributed symmetrically above the center.

Further, the multiple pairs of the mass-blocks 4 may be evenly distributed between the inner casing 1 and the outer casing 2, or concentratedly distributed at two or more places between the inner casing 1 and the outer casing 2. The centers of the multiple mass-blocks 4 are located on the same circumference. The distribution of the resonance bodies is determined according to actual requirements, which is not specifically limited.

Further, the magnitude of stiffness produced by the constraining spring 3 may be directly proportional to the resonance frequency of the mass-block 4. In a case that the rotating shaft is rotated, a centrifugal force on the mass-block 4 is increased, a radius of gyration of the mass-block 4 is increased. Due to the constraining action of the constraining spring 3, a constraining stiffness applied at the mass-block 4 in the tangential direction of the rotation is increased, so that the resonance frequency of the mass-block 4 is increased.

A diesel engine is provided according to the present disclosure, which includes a rotating shaft and the torsional vibration reducer. The number of the resonance bodies is $2n$, where $n \geq 1$. The torsional vibration reducer absorbs torsional vibration energy of multiple harmonics at the same time. If the diesel engine is a four-stroke diesel engine, the resonance bodies absorb the torsional vibration energy of $0.5, 1, 1.5, 2, \ldots, n/2$ harmonics. If the diesel engine is a two-stroke diesel engine, the resonance bodies absorb the torsional vibration energy of $1, 2, 3, \ldots, n$ harmonics.

The technical solution is described with reference to the following specific structure.

The torsional vibration reducer according to the present disclosure includes an inner casing 1, $6n$ constraining springs 3, $2n$ mass-blocks 4, and an outer casing 2, where $n$ 1. The inner casing is formed by two semicircular parts and is fixed to the outer side of the rotating shaft by bolts. Each of the mass-blocks 4 is connected to the inner casing 1 through one constraining spring 3, and is connected to the outer casing 2 through two constraining springs 3. The constraining springs 3 connected to the mass-block 4 are all in a stretched state. In this embodiment, three pairs of resonance bodies are preferably provided, where the volume of the mass-blocks of two pairs of resonance bodies is larger than the volume of the mess-blocks of the other pair of resonance bodies. The three pairs of resonance bodies are arranged in a concentrated manner, where the pair of the resonance bodies having the mass-blocks of the small volume is located between the two pair of the resonance bodies having the mess-blocks of the large volume.

During the rotation of the shaft, due to the centrifugal force, each mass-block 4 is displaced in a radial direction. At this time, due to the action of the constraining springs 3, the stiffness of the constraining spring constraining the mass-block 4 in the tangential direction of the rotating shaft is increased, so that the natural frequency of the subsystem consisting of the mass-block and the constraining springs is increased. If the length, the linear stiffness and the initial relative angle of the springs are properly selected such that the natural frequency of the subsystem consisting of the mass-block and the constraining springs is coincided with a frequency of a harmonic of the rotational speed during the rotation of the rotating shaft, the vibration absorbing system can absorb and control the torsional vibration at this harmonic. Only a part of the angular space of the torsional vibration absorber is occupied by this subsystem consisting of the mass-block and the constraining springs. By arranging n×2 such subsystems evenly in the circumferential direction of the torsional vibration absorber, to respectively absorb the torsional vibration energy of 0.5, 1, 1.5, 2, . . . , n/2 harmonics (four-stroke diesel engine) or 1, 2, 3, . . . , n harmonics (two-stroke diesel engine), the torsional vibration absorbing system can absorb the amplitude of the torsional vibration of multiple harmonics at the same time. Since the torsional vibration of the shafting is mainly distributed at low harmonics, the amplitudes of the torsional vibration of the shafting can be better controlled by absorbing energy at the low harmonics.

The self-adaptive torsional vibration reducer according to the present disclosure includes the inner casing, the outer casing, and the resonance bodies provided between the inner casing and the outer casing. Each of the resonance bodies includes the mass-block and the constraining springs supporting the mass-block between the inner casing and the outer casing. The resonance bodies are provided in pairs and are symmetrically distributed around a center of the rotating shaft. In a case that a frequency of an excitation force on the rotating shaft is coincided with the resonance frequency, the resonance bodies absorb the torsional vibration energy at this frequency to reduce vibration, so that the amplitude value of the torsional vibration is reduced from the source to ensure the safe operation of the shafting system.

Moreover, the torsional vibration reducer is simple in structure and convenient to be installed, thereby reducing the cost.

Based on the above description of the disclosed embodiments, the person skilled in the art can carry out or use the technical solutions in the present disclosure. It is easy for the person skilled in the art to make many modifications to these embodiments. The general principle defined herein may be implemented in other embodiments without departing from the spirit or scope of the present disclosure. Therefore, the present disclosure is not limited to the embodiments illustrated herein, but should be defined by the broadest scope consistent with the principle and novel features disclosed herein.

The invention claimed is:

1. A self-adaptive torsional vibration reducer, comprising:
an inner casing,
an outer casing, and
resonance bodies provided between the inner casing and the outer casing,
wherein the torsional vibration reducer is sleeved on an outer side of a rotating shaft, the inner casing and the outer casing are both arranged concentrically with the rotating shaft, and the inner casing is fastened to the rotating shaft,
each of the resonance bodies comprises a mass-block and constraining springs supporting the mass-block between the inner casing and the outer casing, the resonance bodies are provided in pairs and are symmetrically distributed around a center of the rotating shaft,
the mass-block is connected to the inner casing through at least one of the constraining springs and connected to the outer casing through at least two of the constraining springs, and each of the constraining springs is in a stretched state after being fixedly connected, and
during operation of the rotating shaft, the mass-block has a resonance frequency in a tangential direction of a rotation of the rotating shaft under a constraint of the constraining spring, and in a case that a frequency of an excitation force on the rotating shaft is coincided with the resonance frequency, the resonance bodies absorb torsional vibration energy at the frequency to reduce vibration.

2. The self-adaptive torsional vibration reducer according to claim 1, wherein the resonance bodies comprise at least two resonance bodies symmetrically provided around the center of the rotating shaft.

3. The self-adaptive torsional vibration reducer according to claim 1, wherein the number of the constraining springs is three, the mass-block is vertically connected to the inner casing through one of the constraining springs and connected to the outer casing through two of the constraining springs which are arranged symmetrically and obliquely, and ends of the three constraining springs form apexes of an isosceles triangle.

4. The self-adaptive torsional vibration reducer according to claim 1, wherein mass-blocks in a pair of the resonance bodies provided opposite to each other in a radial direction have same size and shape, and mass-blocks in adjacent pairs of the resonance bodies have same size and shape or have different sizes and shapes.

5. The self-adaptive torsional vibration reducer according to claim 4, wherein the mass-block is in a spherical structure.

6. The self-adaptive torsional vibration reducer according to claim 1, wherein a plurality of pairs of mass-blocks are evenly distributed between the inner casing and the outer casing, or concentratedly distributed at two or more places between the inner casing and the outer casing, and centers of the mass-blocks are located on the same circumference.

7. The self-adaptive torsional vibration reducer according to claim 1, wherein the inner casing is formed in a complete circular structure by splicing at least two parts in arc structures, an inner wall of the circular structure is in close contact with an outer wall of the rotating shaft, and the inner casing is in a pre-tightened state.

8. The self-adaptive torsional vibration reducer according to claim 1, wherein in a case that the rotating shaft is rotated, a centrifugal force acting on the mass-block is increased, a radius of gyration of the mass-block is increased, and due to the constraining action of the constraining spring, a constraining stiffness applied at the mass-block in the tangential direction of the rotation is increased, so that the resonance frequency of the mass-block is increased, and the magnitude of the constraining stiffness is directly proportional to the resonance frequency of the mass-block.

9. A diesel engine, comprising:
a rotating shaft, and
a self-adaptive torsional vibration reducer, comprising an inner casing, an outer casing, and resonance bodies provided between the inner casing and the outer casing,
wherein the torsional vibration reducer is sleeved on an outer side of the rotating shaft, the inner casing and the outer casing are both arranged concentrically with the rotating shaft, and the inner casing is fastened to the rotating shaft,
each of the resonance bodies comprises a mass-block and constraining springs supporting the mass-block between the inner casing and the outer casing, the resonance bodies are provided in pairs and are symmetrically distributed around a center of the rotating shaft,
the mass-block is connected to the inner casing through at least one of the constraining springs and connected to the outer casing through at least two of the constraining springs, and each of the constraining springs is in a stretched state after being fixedly connected,
during operation of the rotating shaft, the mass-block has a resonance frequency in a tangential direction of a rotation of the rotating shaft under a constraint of the constraining spring, and in a case that a frequency of an excitation force on the rotating shaft is coincided with the resonance frequency, the resonance bodies absorb torsional vibration energy at the frequency to reduce vibration,
wherein the number of the resonance bodies is 2n, where n>1, the torsional vibration reducer is configured to absorb torsional vibration energy of a plurality of harmonics at the same time, if the diesel engine is a four-stroke diesel engine, the resonance bodies are configured to absorb the torsional vibration energy of 0.5, 1, 1.5, 2, . . . , n/2 harmonics, if the diesel engine is a two-stroke diesel engine, the resonance bodies are configured to absorb the torsional vibration energy of 1, 2, 3, . . . , n harmonics.

10. The diesel engine according to claim 9, wherein the resonance bodies comprise at least two resonance bodies symmetrically provided around the center of the rotating shaft.

11. The diesel engine according to claim 9, wherein the number of the constraining springs is three, the mass-block is vertically connected to the inner casing through one of the constraining springs and connected to the outer casing through two of the constraining springs which are arranged symmetrically and obliquely, and ends of the three constraining springs form apexes of an isosceles triangle.

12. The diesel engine according to claim 9, wherein mass-blocks in a pair of the resonance bodies provided opposite to each other in a radial direction have same size and shape, and mass-blocks in adjacent pairs of the resonance bodies have same size and shape or have different sizes and shapes.

13. The diesel engine according to claim 12, wherein the mass-block is in a spherical structure.

14. The diesel engine according to claim 9, wherein a plurality of pairs of mass-blocks are evenly distributed between the inner casing and the outer casing, or concentratedly distributed at two or more places between the inner casing and the outer casing, and centers of the mass-blocks are located on the same circumference.

15. The diesel engine according to claim 9, wherein the inner casing is formed in a complete circular structure by splicing at least two parts in arc structures, an inner wall of the circular structure is in close contact with an outer wall of the rotating shaft and, and the inner casing is in a pretightened state.

16. The diesel engine according to claim 9, wherein in a case that the rotating shaft is rotated, a centrifugal force acting on the mass-block is increased, a radius of gyration of the mass-block is increased, and due to the constraining action of the constraining spring, a constraining stiffness applied at the mass-block in the tangential direction of the rotation is increased, so that the resonance frequency of the mass-block is increased, and the magnitude of the constraining stiffness is directly proportional to the resonance frequency of the mass-block.

* * * * *